A. Hathaway,
Grain Drill.

No. 87,490.   Patented Mar. 2, 1869.

Witnesses:
Leopold Oven
A. A. Yeatman

Inventor:
Alexander Hathaway.
Alexander Mason
Atty.

UNITED STATES PATENT OFFICE.

ALEXANDER HATHAWAY, OF INDEPENDENCE, IOWA.

Letters Patent No. 87,490, dated March 2, 1869.

IMPROVEMENT IN SEED-SOWER.

The Schedule referred to in these Letters Patent and making part of the same.

*To all whom it may concern:*

Be it known that I, ALEXANDER HATHAWAY, of Independence, in the county of Buchanan, and in the State of Iowa, have invented certain new and useful Improvements in Seed-Sowers; and do hereby declare that the following is a full, clear, and exact description thereof, reference being had to the accompanying drawings, and to the letters of reference marked thereon.

The nature of my invention consists in the construction and general arrangement of a "seed-sower," but more particularly in the attachment by which the teeth or cultivators are raised out of the ground while in motion, turning around.

In order to enable others skilled in the art to which my invention appertains, to make and use the same, I will now proceed to describe its construction and operation, referring to the annexed drawings, which form a part of this specification, and in which—

Figure 1:
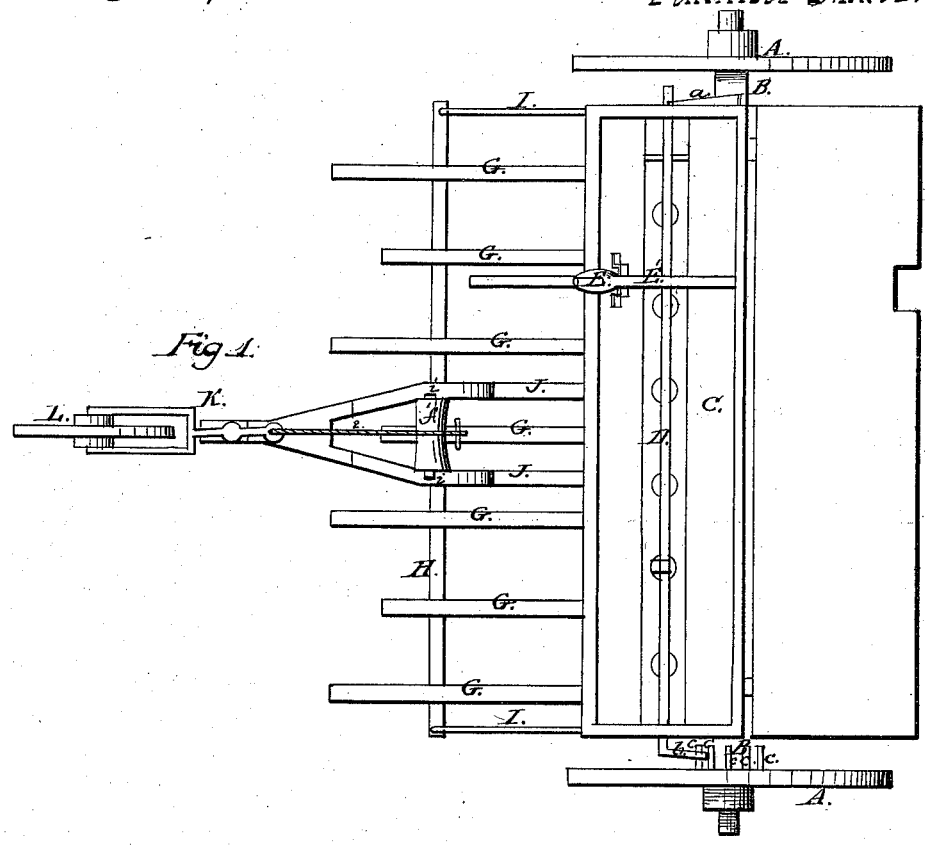

Figure 1 is a plan view, and

Figure 2:
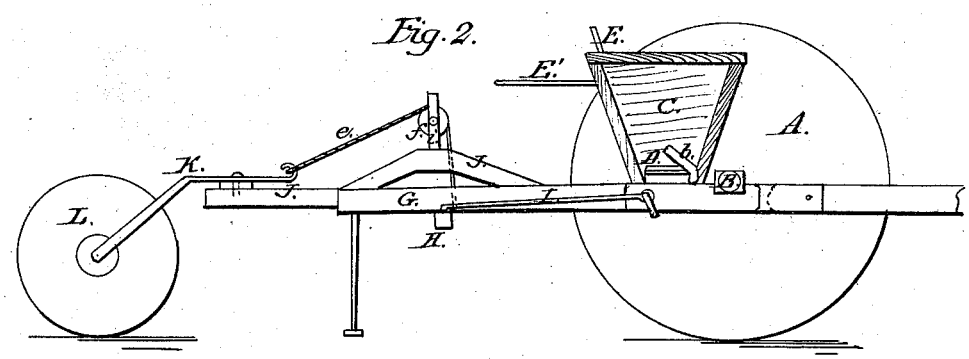

Figure 2, a side elevation in section.

A A represent the wheels of the machine;

B, their axle, which latter supports a frame of suitable construction, on which the seed-box C rests.

This seed-box may be made of any desired form or shape, and is, in its bottom, provided with a series of apertures, through which the seed passes down into the ground.

Above the bottom of the seed-box C, and resting on the same, is a perforated slide, D, which is moved laterally, by means of two levers, E and E'.

The lever E is pivoted to the rear side of the seed-box C, the lower end, in suitable manner, connected with the slide D, and the upper end passing through a hole, or slot in the lever E', which at one end is pivoted in the front side of the box, and rests on the rear side.

The perforations in the slide D are so arranged, that when the slide is moved to one side, the apertures in the bottom of the box C are closed, but when moved to the other side, the perforations in the slide and apertures in the bottom of the box correspond, and allow the seed to pass out.

Above and along the centre of the slide D is placed a shaft, F, which passes through the ends of the box C, and is held in its proper position, by means of a spring, *a*, which is secured to the axle B, and passes through a slot in one end of the shaft.

The other end of the shaft F is provided with an arm, *b*, which is acted upon by a series of cogs or teeth, *c c*, placed on the inner side of the wheel A.

On the shaft F, inside of the box C, is placed a series of small arms, *d d*, one above each aperture in the bottom, which arms, when the shaft is in its proper position, extend perpendicularly downward over said apertures.

It will be seen that when the machine is in motion, and the slide D is drawn so that the apertures in the bottom of the seed-box are open, the cogs or teeth *c c* turn the arm *b*, one after the other, and as soon as said arm is released from one cog, the spring *a* carries the shaft and arm back again, until operated upon by the next cog.

By this means, the arms *d d* are kept in constant motion back and forth, agitating the seed over the apertures, and preventing the same from becoming clogged.

The cultivator-bars G G are all hinged or pivoted in some suitable manner to the frame on which the seed-box rests, the outer ends of said bars being supported by a bar, H, the ends of which are connected, by rods I I, to the frame or axle of the machine.

The bar H is held up by a rope or chain, *e*, which passes over a pulley, *f*, placed between standards *i i*, on arms J J, extending toward the rear from near the centre of the machine.

The arms J J are connected at their outer ends, and on the upper side thereof is pivoted a lever, K, to the inner end of which the rope *e* is secured.

The outer end of the lever K is forked, as shown in fig. 1, and in this end a wheel, L, is placed.

When the machine is turning around, it will be seen that the inner end of the lever K pulls the rope *e*, raising the bar H, and the cultivator-bars G G resting on said bar H, the teeth or cultivators are, of course, raised out of the ground, without any assistance of the operator.

Having thus fully described my invention,

What I claim as new, and desire to secure by Letters Patent, is—

1. Raising the teeth or cultivators of a seed-sower out of the ground, when the machine is turning around, by means of a swinging wheel, having suitable connections with said teeth or cultivators, and without the assistance of the operator, substantially as set forth.

2. The arrangement of the arms J J, forked lever K, wheel L, rope *e*, pulley *f*, and bar H, all substantially as and for the purposes herein set forth.

3. The arrangement of the shaft F, with agitators *d*, spring *a*, arm *b*, and cogs *c c*, all substantially as and for the purposes herein set forth.

In testimony that I claim the foregoing, I have hereunto set my hand, this 2d day of January, 1869.

ALEXANDER HATHAWAY.

Witnesses:
J. S. WOODWARD,
IRA ALEXANDER.